United States Patent
Faulkner

(10) Patent No.: US 10,883,531 B2
(45) Date of Patent: Jan. 5, 2021

(54) THREADED COUPLINGS WITH LOCKING

(71) Applicant: Crompton Technology Group Limited, Solihull (GB)

(72) Inventor: Dale V. L. Faulkner, West Midlands (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 0 days.

(21) Appl. No.: 16/544,011

(22) Filed: Aug. 19, 2019

(65) Prior Publication Data
US 2020/0056648 A1 Feb. 20, 2020

(30) Foreign Application Priority Data
Aug. 17, 2018 (EP) ..................... 18275126

(51) Int. Cl.
*F16B 39/06* (2006.01)
*F16B 39/12* (2006.01)

(52) U.S. Cl.
CPC .............. *F16B 39/06* (2013.01); *F16B 39/12* (2013.01)

(58) Field of Classification Search
CPC ........... F16B 39/06; F16B 39/12; F16B 39/20
See application file for complete search history.

(56) References Cited

U.S. PATENT DOCUMENTS

| | | | |
|---|---|---|---|
| 385,641 A | 7/1888 | Partridge | |
| 1,194,060 A | 8/1916 | Oberdier | |
| 2,821,419 A * | 1/1958 | Walton | B64C 13/02 403/319 |
| 2,956,604 A | 10/1960 | Crotty | |
| 3,704,904 A | 12/1972 | Rizzone | |
| 4,092,080 A * | 5/1978 | Bradley, Jr. | F16B 39/04 403/319 |
| 4,232,978 A | 11/1980 | Cohen | |
| 4,274,754 A | 6/1981 | Cohen | |
| 4,423,992 A | 1/1984 | Ankeny | |
| 4,917,003 A | 4/1990 | Kollross | |
| 4,969,388 A | 11/1990 | Kolhoff et al. | |
| 5,116,178 A * | 5/1992 | Lerman | F16B 39/20 403/316 |

(Continued)

FOREIGN PATENT DOCUMENTS

| | | |
|---|---|---|
| CN | 103644189 A | 3/2014 |
| CN | 203889057 U | 10/2014 |

(Continued)

OTHER PUBLICATIONS

Cohen M, "The Locking Device Dilemma", Machine Design, Penton Media, Cleveland, Ohio, Nov. 21, 1994, 3 pages.

(Continued)

*Primary Examiner* — Vicky A Johnson
(74) *Attorney, Agent, or Firm* — Cantor Colburn LLP

(57) ABSTRACT

A threaded coupling comprises a first coupling member, a second coupling member and a locking assembly. The locking assembly comprises a locking member comprising a pin portion fixed to a flexible cable portion, and a lock nut. When the first coupling member is coupled to the second coupling member the locking assembly is arranged to restrict radial, circumferential and axial movement of the pin portion.

15 Claims, 7 Drawing Sheets

(56) References Cited

U.S. PATENT DOCUMENTS

| | | | |
|---|---|---|---|
| 5,468,103 A * | 11/1995 | Leeson | F16B 1/0071 |
| | | | 29/433 |
| 5,951,222 A * | 9/1999 | Gosling | B23P 19/067 |
| | | | 29/452 |
| 6,048,151 A | 4/2000 | Kwee | |
| 7,179,011 B1 | 2/2007 | Cohen | |
| 7,788,993 B2 | 9/2010 | Wood | |
| 8,622,671 B2 | 1/2014 | Gagneur | |
| 8,679,275 B2 | 3/2014 | Schalla et al. | |
| 8,733,510 B2 | 5/2014 | Haase | |
| 8,992,148 B2 | 3/2015 | Schafer et al. | |
| 2019/0120278 A1 * | 4/2019 | Faulkner | F16B 39/06 |
| 2020/0056648 A1 * | 2/2020 | Faulkner | F16B 39/12 |

FOREIGN PATENT DOCUMENTS

| | | | |
|---|---|---|---|
| GB | 607745 A * | 9/1948 | F16B 39/20 |
| KR | 20120057380 A | 6/2012 | |
| WO | 0011359 A1 | 3/2000 | |

OTHER PUBLICATIONS

Extended European Search Report for International Application No. 17275168.7 dated Apr. 18, 2018, 7 pages.
Extended European Search Report for International Application No. 18275126.3 dated Nov. 14, 2018, 11 pages.

* cited by examiner

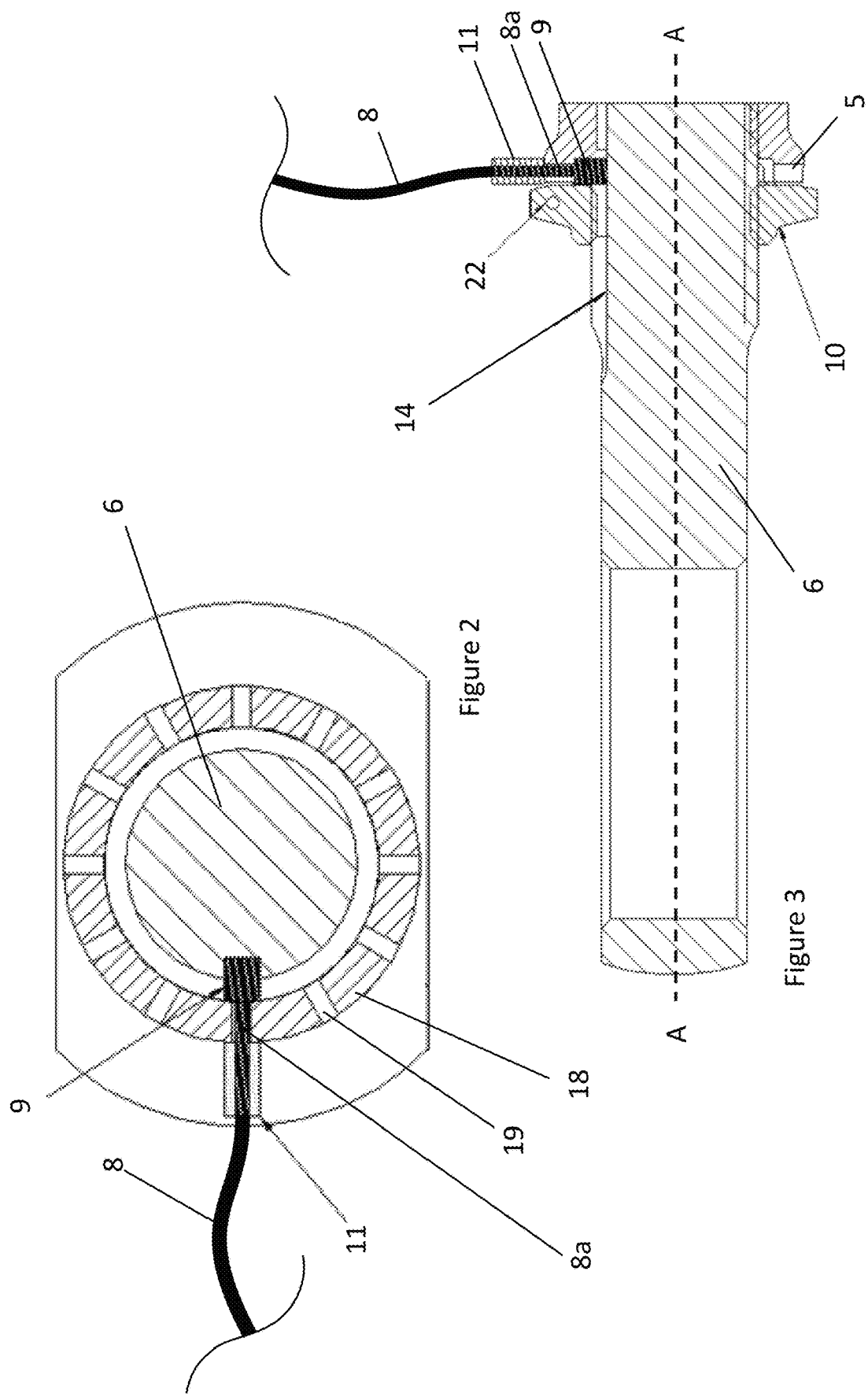

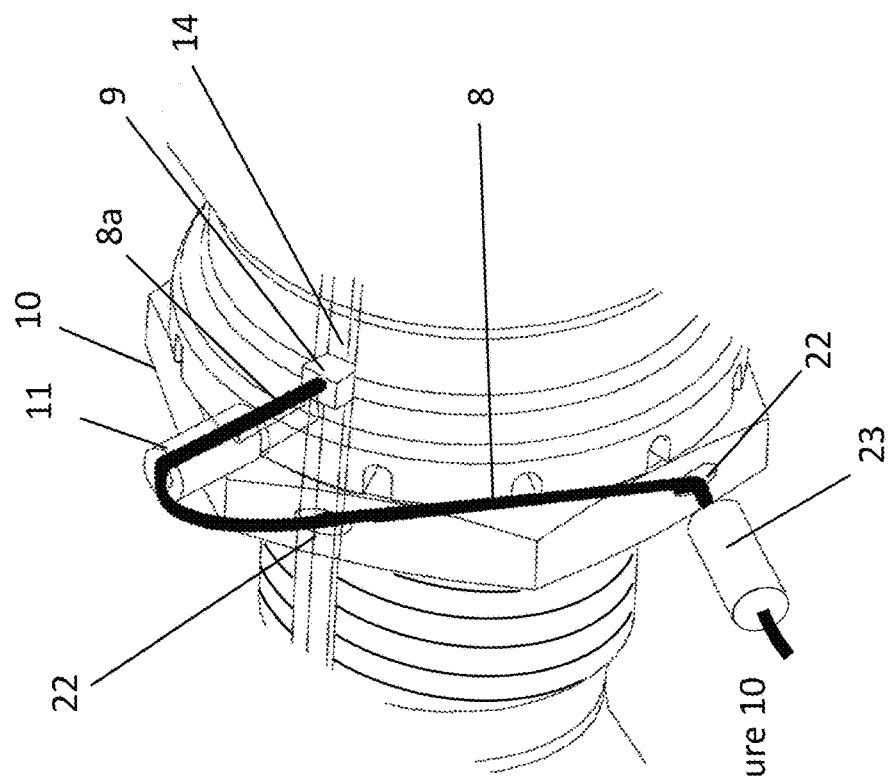
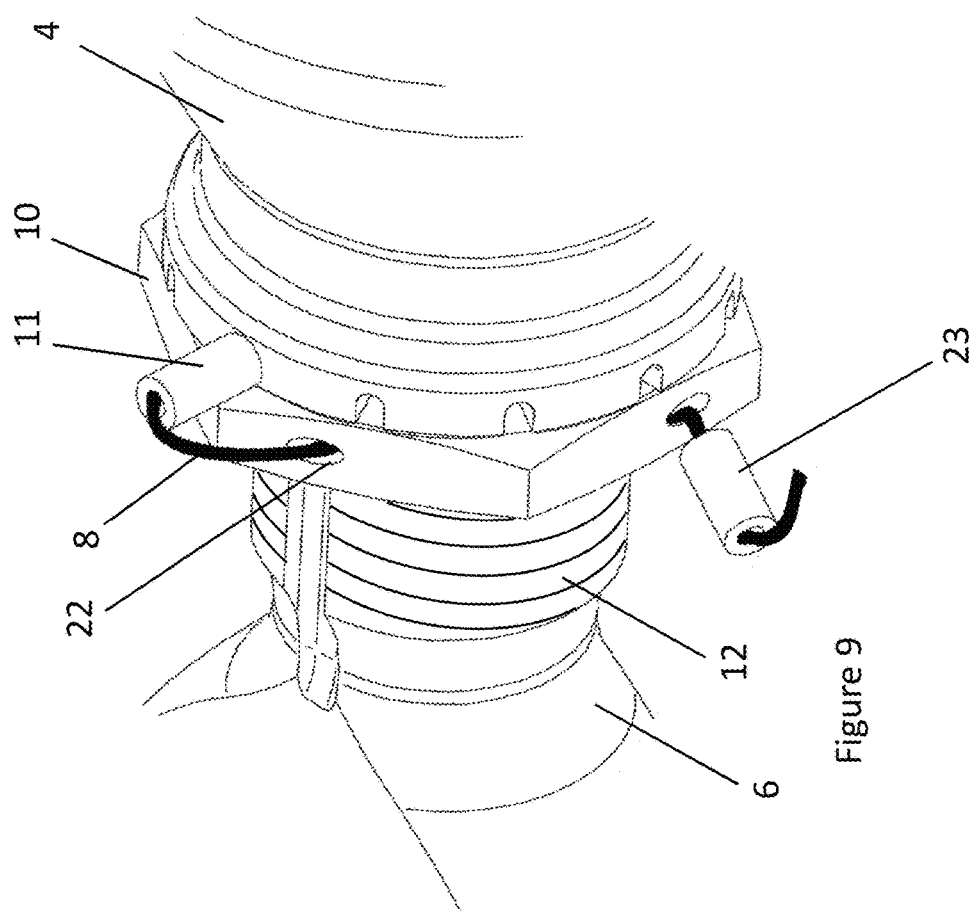

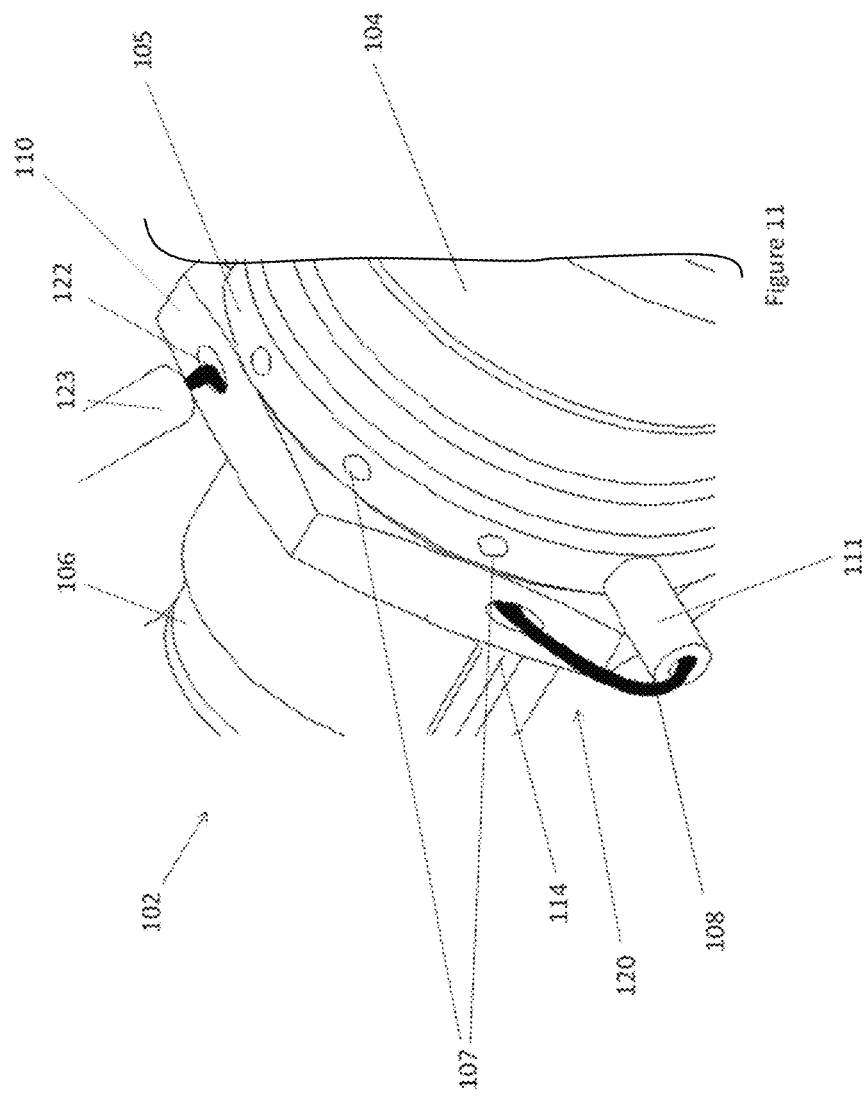

THREADED COUPLINGS WITH LOCKING

FOREIGN PRIORITY

This application claims priority to European Patent Application No. 18275126.3 filed Aug. 17, 2018, the entire contents of which is incorporated herein by reference.

TECHNICAL FIELD

The present disclosure relates to threaded couplings, particularly threaded couplings comprising a locking assembly. Methods of assembling a threaded coupling are also disclosed.

BACKGROUND

Threaded couplings, comprising an externally threaded member and an internally threaded member which are threadedly engagable, are often used at joints within mechanical systems to enable rotational and length adjustment of the joint. This may be useful, for example, where final assembly of the system takes place at a different location to the production of the component parts. The length and angular position of the joint can be adjusted by rotating the members relative to one another. In some mechanical systems, the setting of the relative angular position of the members is referred to as timing.

At least in the aerospace industry, a locking assembly is typically provided for the threaded coupling, which prevents further rotation (and therefore changes in length) once the correct angle and length has been achieved. This is referred to as locking, and is typically achieved using a lock washer and a keyway cut into the externally threaded member. The lock washer features a key which projects radially inwards to engage with the keyway, along with a radial rib that engages with the internally threaded member. A lock nut then secures the washer in place such that it cannot be disengaged, ensuring that the relative position of the two threaded members is fixed. An example of such a locking assembly is seen in U.S. Pat. No. 4,423,992.

As well as adjustable length, timing and locking, threaded couplings for aerospace components require secondary locking to fulfil safety requirements for flight. In the locking assembly seen in U.S. Pat. No. 4,423,992, for example, a safety wire is threaded through holes in the lock nut and washer.

Typical locking assemblies as described above comprise bulky components, and in weight sensitive applications, such as in the aerospace industry, additional weight is highly undesirable. In addition, typical locking assemblies can considerably increase the length of a threaded coupling.

The present disclosure seeks to address these shortcomings by providing a threaded coupling comprising a secure locking assembly with reduced length and weight.

SUMMARY

According to a first aspect of the present disclosure there is provided a threaded coupling. The coupling includes a first coupling member, comprising a cylindrical portion which is internally threaded around an axis of rotational symmetry of the cylindrical portion and comprises an open end that defines an opening with an annular rim, the annular rim comprising at least one projection that projects in a generally axial direction parallel to the axis of rotational symmetry of the cylindrical portion and a second coupling member comprising an externally threaded portion and at least one key cavity. The coupling also includes a locking assembly comprising: a locking member comprising a pin portion fixed to a flexible cable portion; and a lock nut. The externally threaded portion is arranged to be received through the opening to be threadedly engaged with the internally threaded cylindrical portion, to couple the first coupling member to the second coupling member. In this embodiment: when the first coupling member is coupled to the second coupling member: the pin portion is arranged to be seated in the at least one key cavity and be confined by an inner surface of the annular rim so as to restrict radial movement of the pin portion; the flexible cable portion is arranged to extend from the pin portion in a generally radial direction adjacent to a surface of the at least one projection so as to restrict circumferential movement of the flexible cable portion; and wherein the lock nut is arranged, when the first coupling member is coupled to the second coupling member, to be threaded onto the second coupling member and positioned so as to restrict axial movement of the pin portion.

Thus, the pin portion is directly restricted from moving radially (relative to the axis of rotational symmetry of the cylindrical portion) and axially, and the flexible cable portion is directly restricted from moving circumferentially, relative to the first coupling member. As the pin portion is fixed to the flexible cable portion the movement of the pin portion is thus restricted in all directions.

The pin portion is engaged with the second coupling member via the key cavity and, as a result, relative rotation of the first and second coupling members is restricted. Because the movement of the pin portion is restricted in the axial and radial directions it cannot be easily or accidentally removed.

Therefore, it will be seen by those skilled in the art that, in accordance with the disclosure, a threaded coupling is provided that requires less material and is more space efficient while still providing effective locking and timing. This results in weight and cost savings as well as enabling the coupling to be used in space limited locations.

The locking member is distinguished from any other example of lock means, for example a lock washer, by its ability to be removed from the assembled threaded coupling without entirely separating the first and second coupling members. Accordingly, the pin portion preferably has an angular extent relative to the cylindrical portion of less than 180°. (i.e. the pin portion preferably extends no more than halfway around the cylindrical portion). Further preferably the angular extent of the pin portion is less than 90°, for example 30° or less, 20° or less, or 10° or less. In other words, the pin portion may be a relatively small component that can be easily moved axially into position without requiring angular alignment about the axis of the cylindrical portion. This enables simpler assembly and repair.

As mentioned above, it is desirable to minimise the total length of the threaded coupling. As such, in preferable examples the at least one projection projects a projection distance in the axial direction and the flexible cable portion has a width that is less than or equal to the projection distance. Further preferably, the flexible cable portion has a thickness in the axial direction when seated which is equal to the projection distance. This ensures that the flexible cable portion adjacent to the surface of the at least on projection cannot, when seated, move in the axial direction.

The projection distance may be minimised to further reduce the length, although locking torque requirements may define a minimum acceptable projection distance, in that the threaded coupling must remain locked when the first and second coupling members experience a certain relative torque. The projection distance is preferably chosen to be the smallest distance that provides the required torque resistance.

The lock nut may be positioned, when the first coupling member is coupled to the second coupling member, such that it abuts (e.g. is tightened against) the annular rim and axially confines the flexible cable portion. It will be understood that because the pin portion is fixed to the flexible cable portion, this has the effect of restricting axial movement of the pin portion. Additionally or alternatively, the lock nut may be positioned, when the first coupling member is coupled to the second coupling member, such that it abuts the pin portion, directly restricting its axial movement. The lock nut may be positioned such that it abuts either or both of the pin portion and the annular rim.

The surface of the at least one projection adjacent to which the flexible cable portion extends may comprise a side surface of the at least one projection, i.e. one that extends generally perpendicularly to the circumferential direction. It will be appreciated that circumferential movement of the pin portion may be restricted by the at least one surface even when the flexible cable portion is not directly in contact with the at least one surface. In such examples circumferential movement beyond a certain angular range is prevented by the flexible cable portion coming into contact with the at least one surface.

In some examples the first coupling member comprises a plurality of projections, e.g. six, eight, twelve or even more, positioned around the annular rim such that one or more gaps (e.g. grooves) are defined therebetween by side surfaces of the projections. The flexible cable portion may be arranged to extend through the one or more gaps, i.e. in a generally radial direction adjacent to the side surfaces of the projections defining the gap. It will be appreciated that the width of the gap between the side surfaces, as compared to the diameter of the flexible cable portion, will determine how closely the flexible cable portion extends adjacent to the side surfaces. In turn, this will determine to what degree the flexible cable portion has some freedom to flex side to side within the gap, i.e. to what degree circumferential movement of the flexible cable portion and pin portion is restricted as described above. In at least some such examples, the flexible cable portion is preferably arranged to be seated securely in the gaps. The gaps and/or the flexible cable portion may be dimensioned such that the flexible cable portion is substantially in contact with one or more of the side surfaces of the projections. This means that any circumferential movement of the flexible cable portion is largely or entirely prevented.

In at least some examples the flexible cable portion may not be in contact with the side surfaces of the projections defining a gap, e.g. because the flexible cable portion is thinner than the gap. The locking assembly may further comprise a cable sleeve arranged to adapt the shape of the flexible cable portion. The cable sleeve may be arranged to increase an effective width or shape of the flexible cable portion. This may enable, for example, a common or standard flexible cable to be used in a variety of different threaded couplings (e.g. with differently shaped or configured projections and gaps). In some examples, the cable sleeve may increase an effective width of the flexible cable portion to ensure the flexible cable portion is securely seated within a gap (which would otherwise permit some relative movement of the flexible cable portion). For example, the cable sleeve may be a "top hat" sleeve arranged to slide around or over the flexible cable portion. The cable sleeve and/or the gaps may be dimensioned such that the cable sleeve is substantially in contact with one or more of the side surfaces of the projections. This means that circumferential movement of the flexible cable portion in the gap can be restricted.

In locking assemblies for threaded couplings typical of the prior art, it is only possible to adjust the length of the threaded coupling by rotating the coupling members relative to each other by whole (360°) turns, which for some thread pitches can correspond to a considerable length adjustment. Accordingly, in some examples the first coupling member comprises two or more gaps, which enables the timing of the threaded coupling to be adjusted by angles less than a whole turn (i.e. by moving the flexible cable portion to the next gap) and allows the same threaded coupling to be utilised in a variety of different applications that require different timing. Such examples provide for much finer resolution of length adjustment, in addition to other distinctions between the present disclosure and the prior art. In such examples the flexible cable portion may be arranged to extend adjacent to a surface of at least two projections. Preferably, each of the plurality of projections has the same shape and/or size. In some examples the projections are equiangularly spaced around the rim of the cylindrical portion, although other spacing patterns are possible.

The pin portion preferably comprises a complementary shape to that of the at least one key cavity, i.e. a shape such that when seated in the key cavity the pin portion is held tightly in place. This minimises the amount of possible relative movement between the first and second coupling members (due to movement of the pin portion within the key cavity) and reduces wear on the pin portion and on the cavity due to fretting.

The flexible cable portion is preferably made from metal, for example stainless steel, galvanized mild or carbon steel, copper, a nickel-chromium alloy or any other suitable metal or alloy, although other materials may be used. The flexible cable portion may comprise a single flexible wire or strand but preferably the cable portion comprises multiple strands or filaments (e.g. up to 100 or more filaments), which may be braided or otherwise interwoven such that they act as a single flexible member.

The flexible cable portion preferably has a round or circular cross sectional profile. This provides the cable with good strength and facilitates crimping.

The flexible cable portion preferably comprises locking wire or safety cable. The flexible cable portion may be jacketed (e.g. with a nylon or PVC jacket) to protect from damage and/or corrosion.

The pin portion may comprise a cube, a sphere, a hexagonal prism or any other shape. Preferably the pin portion comprises a standard end ferrule for locking wire or safety cable. Using a standard, commercially available end ferrule may reduce costs. In preferred examples the pin portion comprises an end ferrule which is securely attached (e.g. crimped) to the flexible cable portion. The pin portion may comprise a metal and is preferably formed of the same material as the flexible cable portion.

The locking assembly may comprise an adapter member arranged to modify the shape of the pin portion to enable, for example, a common pin portion to be adapted for use in a variety of different key cavities in different threaded couplings (for example by increasing an effective size of the pin portion). The adapter member may, for example, comprise a cup washer arranged to slide over the pin portion.

As mentioned above, circumferential movement of the flexible cable portion is restricted by an adjacent projection surface, which has the effect of restricting circumferential movement of the pin portion relative to the first coupling member. This restriction may be particularly effective if the flexible cable portion is taut as it extends adjacent to the surface of the at least one projection. The flexible cable portion may, therefore, be held in tension (i.e. taut) as it extends from the pin portion adjacent to the surface of the at least one projection, for example by being deformed or twisted around itself. In preferred examples, the locking member further comprises a securing member which is secured to the flexible cable portion and abuts a radially exterior surface of the rim so as to hold the flexible cable portion between the pin portion and the securing member taut. The securing member preferably comprises a ring, or ferrule, that is placed onto the flexible cable portion and secured to the flexible cable portion, e.g. by being crimped thereto. The securing member is preferably made of a malleable metal or alloy, to facilitate it being crimped to the flexible cable portion.

It may be desirable for the length or timing of the threaded coupling to be adjusted after assembly. While, in some examples, this may be achieved with a re-usable locking member, in preferred examples the locking member comprises a consumable single-use component. If the threaded coupling needs to be adjusted, the old locking member may be simply removed and discarded, and a new locking member installed.

The locking assembly provides positive locking to the threaded coupling, preventing relative rotation between the first and second members as well as changes in length of the threaded coupling. However, in some applications secondary locking may also be required, wherein the lock nut is itself secured against relative rotation such that it does not loosen/unscrew (and risk unlocking the coupling). This can, for example, be particularly important when the threaded coupling is subject to vibrations during use, e.g. in flight.

Accordingly, in some examples the lock nut comprises at least one through-hole through which the flexible cable portion extends and is secured thereat. In such examples the flexible cable portion may be considered as acting as locking or safety wire. The flexible cable portion is preferably pulled taut between the pin portion and the lock nut in a direction opposite to the threading of the lock nut, so as to prevent the lock nut being loosened. The flexible cable portion may be secured after it extends through the at least one through-hole by simply deforming or twisting two sections of the cable portion together (e.g. to form a closed loop). However, this may impede or even prevent the flexible cable portion extending beyond the lock pin (e.g. to be used with other components). In preferred embodiments, therefore, a secondary securing member is used to secure the flexible cable portion. The secondary securing member preferably comprises a ring, or ferrule, which is placed onto the flexible cable portion and secured to the flexible cable portion adjacent to the at least one through hole (e.g. by crimping), so as to prevent the flexible cable portion retreating back through the through hole and preferably, as mentioned above, to hold the flexible cable portion in tension (i.e. taut). The ferrule is preferably made of a malleable metal or alloy, such that it can be secured to the flexible cable portion by crimping.

The position of at least one through-hole on the lock pin may be chosen to minimise the distance between the through-hole and the pin portion when the threaded coupling is assembled. This minimises the length of the flexible cable portion required, thus reducing the weight and cost of the threaded coupling.

It will therefore be understood that in many of the examples above, the flexible cable portion serves two separate purposes. It both prevents the pin portion from moving circumferentially or axially, thus helping to provide effective primary locking to the threaded coupling, and may also (at least in some examples), prevent the lock nut from coming loose, thus providing secondary locking to the threaded coupling. Using the same component to perform both of these functions reduces the part count and complexity of the threaded coupling and may also, therefore, reduce its weight and cost.

The flexible cable portion may be secured to one or more further components, such as a cylinder body, a lock washer, a locking tab or a piston rod. The one or more further components may feature one or more through-holes through which the flexible cable portion extends. As described above for the example of a lock nut, the locking assembly may further comprise a secondary securing member to secure the flexible cable portion after it passes through such through-holes. The secondary securing member preferably comprises a ring, or ferrule, which is placed onto the flexible cable portion and secured to the flexible cable portion adjacent to the through-hole (e.g. by crimping).

The Applicant has recognised that the threaded coupling described herein may be particularly suited for use when connected to a further component made of fibre reinforced polymer matrix composite material, for example a carbon fibre reinforced polymer (CFRP) rod. In some examples the first coupling member comprises a connection means for connecting the first coupling member to a further component made of fibre reinforced polymer matrix composite material (e.g. a structural component). Preferably the connection means comprises an internally or externally threaded portion which is arranged to be screwed onto the end of the structural component.

The threaded portion may be designed to cut into the structural component to provide a secure attachment between the threaded coupling and the structural component. In such cases a large torque may be required to screw the threaded portion onto the structural component.

The Applicant has recognised that the at least one projection may be used to facilitate the application of torque. In some examples, therefore, the at least one projection may serve as a torque application point for driving (e.g. screwing) the first coupling member onto the structural component. The rim may comprise one or more additional features to facilitate the application of torque. For example, the plurality of projections may comprise one or more notches. A C-spanner may engage with such notches when used to tighten the first coupling member e.g. end fitting onto a structural component, or to react the torque when tightening the lock nut.

Preferably the at least one projection is shaped so as to receive a standard torque application tool such as a C-spanner. This avoids the need to incorporate alternative torque application points or structures (e.g. spanner flats) onto the first coupling member, saving material, weight and costs.

The first coupling member may comprise one or more regions where material has been removed. As mentioned above, this may comprise one or more notches in the plurality of projections, to facilitate torque application but, additionally or alternatively, material may be removed solely to save weight. For example, a central portion of one or more of the plurality of projections may comprise at least one void, reducing the weight of the first coupling member.

The second coupling member may comprise a rod end, a clevis, a blade end, a bush housing or any other suitable component that may require precise timing.

In use, threaded couplings can experience heavy vibrations, for example on an aircraft during flight. These vibrations and/or other movements can result in differential torques being applied to the first and second coupling members. Without the locking mechanisms described herein, the timing of the threaded coupling could be lost and the coupling members may become loose or even separate entirely. Even when locking and timing is provided by the locking assembly, vibrations can cause fretting on, for example, the pin portion, due to small but repetitive relative movements of the first and second coupling members.

It is desirable to mitigate any such fretting and, as such, in preferred examples, the lock nut is positioned tightly against the annular rim (i.e. tightened on to the annular rim), to provide additional resistance to any relative movement of the first and second coupling members. This may mitigate fretting and reduce loads on the pin and flexible cable portions.

According to a second aspect of the present disclosure there is provided a method of assembling a threaded coupling, the threaded coupling comprising: a first coupling member, comprising a cylindrical portion which is internally threaded around an axis of rotational symmetry of the cylindrical portion and comprises an open end that defines an opening with an annular rim, the annular rim comprising at least one projection that projects in a generally axial direction parallel to the axis of rotational symmetry of the cylindrical portion; and a second coupling member comprising an externally threaded portion and at least one key cavity; and a locking assembly comprising: a locking member comprising a pin portion fixed to a flexible cable portion; and a lock nut. The method includes: threading the lock nut onto the second coupling member; threadedly engaging the first coupling member onto the second coupling member to couple the first coupling member to the second coupling member; positioning the locking member such that the pin portion is seated in the at least one key cavity and confined by an inner surface of the annular rim and the flexible cable portion extends from the pin portion in a generally radial direction adjacent to a surface of the at least one projection; and positioning the lock nut so as to restrict axial movement of the pin portion.

Thus a threaded coupling is assembled for which a desired length and/or a desired timing is achieved and locked in place. As mentioned above, preferably the method comprises tightening the lock nut against the annular rim. This can help to limit axial movement of the pin portion, e.g. resulting from vibrations during service.

The method may comprise putting into tension the flexible cable portion extending adjacent to the surface of the at least one projection. This may comprise applying a securing member (such as a ring or ferrule) to the flexible cable portion and securing (e.g. by crimping) said securing member to the flexible cable portion so as to hold the flexible cable portion taut.

The lock nut may comprise at least one through-hole and the method may comprise extending the flexible cable portion therethrough and securing the flexible cable portion thereat. In these examples another securing member (such as a ferrule) may be secured (e.g. by crimping) to the flexible cable portion where the flexible cable portion exits the through-hole of the lock nut. Preferably the method comprises putting the flexible cable portion in tension (i.e. taut) between the pin portion and the lock nut.

The method may comprise extending the flexible cable portion to or through at least one further component. The method may comprise applying and optionally securing one or more further securing members to the flexible cable portion.

The method may comprise applying a torque to the first coupling member via the at least one projection to drive the first coupling member onto a structural component (e.g. an FRP tube).

In the threaded coupling described above, locking and timing is provided at least partially by at least one projection that projects from the annular rim in a generally axial direction. Such projection(s) in the annular rim can allow various different types of locking member to be confined. However, the Applicant has recognised that when the locking member comprises a pin portion fixed to a flexible cable portion, effective locking and timing may alternatively be provided by the annular rim comprising at least one through hole, through which the flexible cable member extends in a radial direction.

From another aspect, therefore, the present disclosure extends to a threaded coupling comprising: a first coupling member, comprising a cylindrical portion which is internally threaded around an axis of rotational symmetry of the cylindrical portion and comprises an open end that defines an opening with an annular rim, the annular rim comprising at least one timing through-hole that extends through the rim in a generally radial direction perpendicular to the axis of rotational symmetry of the cylindrical portion; a second coupling member comprising an externally threaded portion and at least one key cavity; and a locking assembly comprising: a locking member comprising a pin portion fixed to a flexible cable portion. The externally threaded portion is arranged to be received through the opening to be threadedly engaged with the internally threaded cylindrical portion, to couple the first coupling member to the second coupling member, and wherein, when the first coupling member is coupled to the second coupling member: the pin portion is arranged to be seated in the at least one key cavity and be confined by an inner surface of the annular rim so as to restrict radial movement of the pin portion; and the flexible cable portion is arranged to extend from the pin portion in a generally radial direction through the at least one timing through-hole so as to restrict circumferential and axial movement of the flexible cable portion.

Thus, the pin portion is directly restricted from moving radially (relative to the axis of rotational symmetry of the cylindrical portion), and the flexible cable portion is directly restricted from moving axially and circumferentially, relative to the first coupling member. As the pin portion is fixed to the flexible cable portion, the movement of the pin portion is thus restricted in all directions. As a result, the pin portion may not be able to move even when the coupling experiences vibrations during service.

The pin portion is engaged with the second coupling member via the key cavity and, as a result, relative rotation of the first and second coupling members is restricted. Because the movement of the pin portion is restricted in the axial and radial directions, it cannot be easily or accidentally removed. Thus locking and timing is provided to the threaded coupling.

As mentioned above, in use (e.g. on an aircraft during flight), the threaded coupling may experience vibrations and/or inertial loads. This can result in differential forces and/or torques being experienced by the first and second coupling members. In these circumstances, the locking assembly prevents the threaded coupling from losing its timing or even becoming entirely uncoupled. However, repeated stresses on the pin portion and/or flexible cable portion due to, for example, differential forces/torques can cause fretting and/or wear of the pin portion and/or of the flexible cable portion.

Therefore, in preferred examples, the locking assembly further comprises a lock nut which is arranged, when the first coupling member is coupled to the second coupling member, to be threaded onto the second coupling and positioned against the annular rim (e.g. tightened on to the annular rim). This mitigates relative movement of the first and second coupling members, at least against a low level of relative forces/torques. This serves to stabilise the threaded coupling, e.g. by reducing the exposure of the pin portion and/or flexible cable portion to fretting and/or wear caused by repeated movements or vibrations.

In some examples, the annular rim comprises a plurality of timing through-holes, e.g. six, eight, twelve or even more. The plurality of timing through-holes provides multiple timing options. The plurality of timing through-holes may be evenly spaced around the annular rim.

The locking assembly may further comprise a cable sleeve arranged to adapt the shape of the flexible cable portion. The cable sleeve may be arranged to increase an effective width or shape of the flexible cable portion. The cable sleeve may therefore act to better match the flexible cable portion to the width or shape of the timing through-hole, again reducing the likelihood of fretting during service.

The flexible cable portion preferably has a round or circular cross-sectional profile. Preferably, the at least one timing through-hole has a cross-section which matches or is similar to that of the flexible cable portion (e.g. circular), such that the flexible cable portion fits snugly within the at least one timing through-hole.

The flexible cable portion may be held in tension (i.e. taut) as it extends from the pin portion through the at least one timing through-hole, for example by being deformed or twisted around itself. In preferred examples, the locking member further comprises a securing member which is secured to the flexible cable portion and abuts a radially exterior surface of the rim so as to hold the flexible cable portion between the pin portion and the securing member taut as it extends through the timing through-hole. The securing member preferably comprises a ring, or ferrule, that is placed onto the flexible cable portion and secured to the flexible cable portion, e.g. by being crimped thereto.

In examples featuring a lock nut, the lock nut may comprise at least one additional through-hole through which the flexible cable portion extends and is secured thereat. The flexible cable portion is preferably pulled taut between the pin portion and the lock nut in a direction opposite to the threading of the lock nut, so as to prevent the lock nut being loosened.

The annular rim may serve as a torque application point for driving (e.g. screwing) the first coupling member onto a structural component (e.g. a FRP rod). The rim may comprise one or more additional features to facilitate the application of torque.

Features of any aspect or example described herein may, wherever appropriate, be applied to any other aspect or example described herein. Where reference is made to different examples, it should be understood that these are not necessarily distinct but may overlap. It will be appreciated that all of the preferred features of the threaded coupling according to the first aspect described above may also apply to the other aspects of the disclosure.

BRIEF DESCRIPTION OF THE DRAWINGS

One or more non-limiting examples will now be described, by way of example only, and with reference to the accompanying figures, in which:

FIGS. 2 and 3 are cross sectional views of the assembled threaded coupling according to the first example of the present disclosure;

FIGS. 9 and 10 are further views showing secondary locking of the threaded coupling shown in FIGS. 1-3; and FIG. 11 shows a threaded coupling according to another example of the present disclosure.

DETAILED DESCRIPTION

Figure 1:
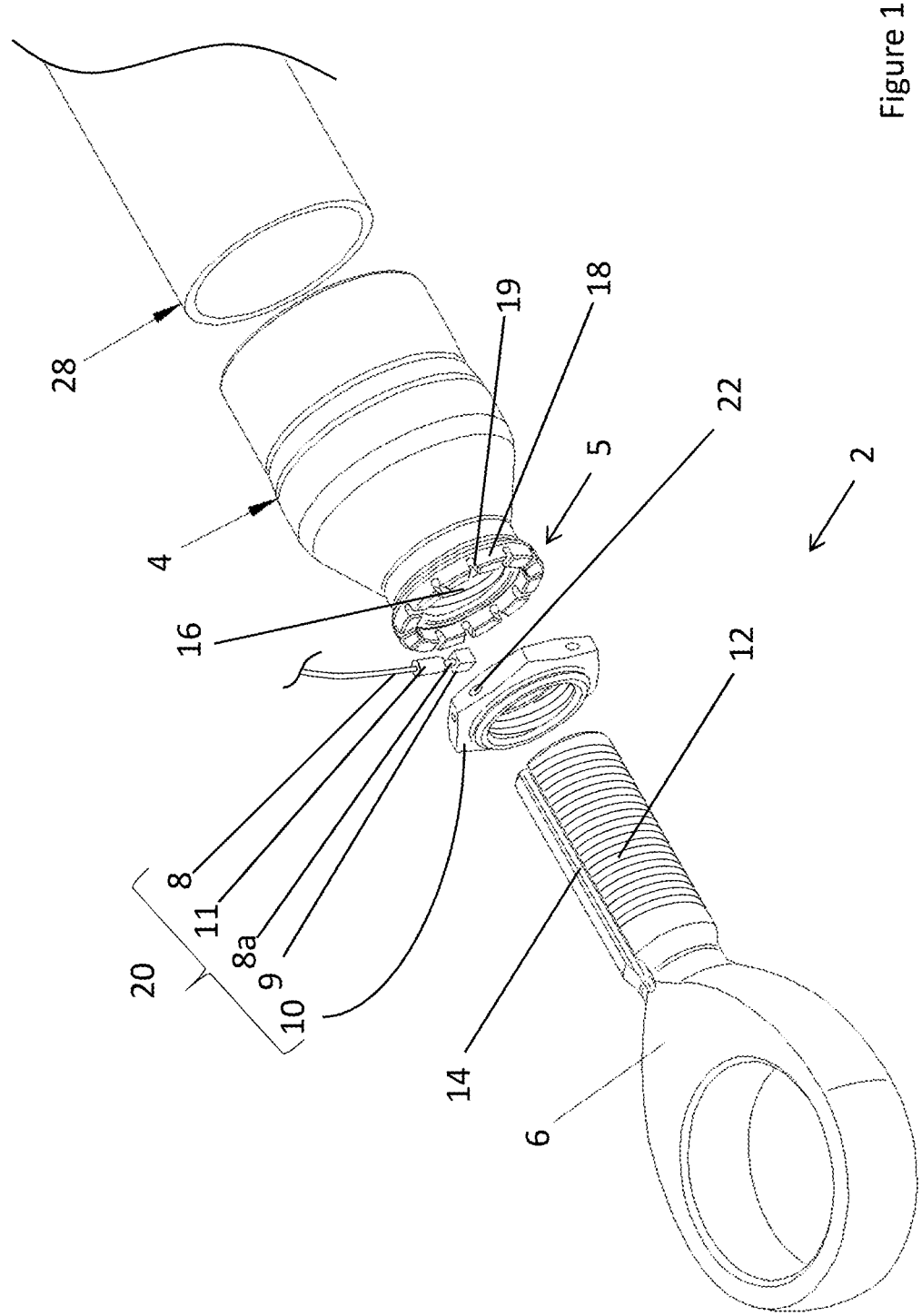
FIG. 1 is an exploded view of a threaded coupling according to a first example of the present disclosure.

FIG. 1 shows a threaded coupling 2 comprising a first coupling member in the form of an end fitting 4, a second coupling member in the form of a rod end 6 and a locking assembly 20 comprising a locking member 8a, 9, 11 and a lock nut 10. The locking member includes a flexible cable portion 8a fixed to a pin portion e.g. end ferrule 9, and optionally includes a further ferrule 11, as will be described in more detail below. The locking member 8a, 9, 11 may be carried by a locking cable 8. The rod end 6 comprises a cylindrical externally threaded portion 12 and a key cavity in the form of a keyway 14, which comprises a groove cut along the externally threaded portion 12. The end fitting 4 comprises a cylindrical internally threaded portion 16 that is threadedly engageable with the externally threaded portion 12 to couple the end fitting 4 to the rod end 6.

The end fitting 4 further comprises an annular rim 5 that defines a circular opening through which the externally threaded portion 12 may be inserted to engage with the internally threaded portion 16. The rim 5 comprises a plurality of projections 18 (in this case, twelve) which project in an axial direction parallel to the axis of rotational symmetry of the cylindrical internally threaded portion 16.

In this example the projections 18 are equally sized and evenly spaced around the rim 5 to define a plurality of equally sized gaps 19 between adjacent projections 18. In this example the gaps 19 appear as grooves between adjacent projections 18, but of course the shape and spacing of the projections 18 will dictate the dimensions of the gaps 19 and in some other examples the gaps 19 may appear more like holes than grooves.

When assembled, the rod end 6 is coupled to the end fitting 4 through the threadedly engaged internally threaded portion 16 and the externally threaded portion 12. The length of the threaded coupling 2 and the orientation of the rod end 6 with respect to the end fitting 4, also referred to as the timing of the threaded coupling, can be adjusted by rotating the rod end 6 relative to the end fitting 4.

The flexible cable portion 8a, the pin portion 9 and the lock nut 10 are the main components of the locking assembly 20. When the threaded coupling 2 is assembled, and the desired length and timing achieved, the pin portion 9 is seated in the keyway 14 and positioned inside the rim 5, such that the cable portion 8a extends from the pin portion 9 in a generally radial direction across the rim 5 in a gap 19 between two of the plurality of projections 18. The cable portion 8a therefore extends adjacent to one or more side surfaces of the projections 18 that define the gaps 19. Because the cable portion 8a is located in one of the gaps 19, the pin portion 9 fixed to the cable portion 8a is prevented from moving circumferentially relative to the end fitting 4. Optionally, the locking assembly 20 further comprises a securing member, shown here as a crimp ferrule 11, which is crimped onto the cable portion 8a as it extends radially away from the rim 5 such that the section of the cable portion 8a that passes across the rim 5 in the gap 19 is put in tension (i.e. it is taut).

The keyway 14 has a radial depth, and the pin portion 9 has a radial dimension (e.g. depth) less than or equal to this radial depth, such that when seated with the rod end 6 in place, the pin portion 9 is confined. The pin portion 9 is wider (i.e. its circumferential dimension) than the gaps 19, such that, once in place, it cannot be removed by moving it radially.

The lock nut 10 comprises an internally threaded surface which is arranged to engage with the externally threaded portion 12 of the rod end 6. When the threaded coupling 2 is assembled, the lock nut 10 is screwed or torqued via the threaded engagement with the externally threaded portion 12 into a locking position where the lock nut sits against the rim 5 of the end fitting 4 and/or against the pin portion 9. This restricts the axial movement of the locking member 8a, 9. The pin portion 9 is thus prevented from moving radially, axially or circumferentially, i.e. it is fixed in place.

The disposal of the pin portion 9 within the keyway 14, and its aforementioned restriction on movement in the circumferential direction, prevents the relative rotation of the rod end 6 and the end fitting 4. This ensures that it is not possible to change the length of the threaded coupling 2 or adjust its timing while the pin portion 9 is seated. In other words, the threaded coupling 2 is locked in position. The cable portion 8a may extend through any of the gaps 19, to enable the timing and length of the threaded coupling 2 to be adjusted by fractions of a whole turn. In this example there are twelve projections 18 defining twelve gaps 19, with a 30° angular separation between them. This allows the timing of the threaded coupling 2 to be adjusted in steps of 30°.

The length of the threaded coupling 2 may be adjusted in steps dependent on the pitch of the threaded portions 12, 16 divided by the number of projections 18 or gaps 19. For a typical thread pitch of 2 mm and with twelve gaps 19, the length may be adjusted in steps of 0.17 mm. Of course other thread pitches and numbers of projections/gaps are possible.

To adjust the length or timing of the threaded coupling 2 once assembled, the lock nut 10 must be retracted from its locking position (e.g. against the rim 5) a distance such that the cable portion 8a may be extracted axially from the gap 19. The minimum retraction distance for which extraction is possible is equal to the width of the cable portion 8a, which may be significantly less than the axial thickness of the projections 18. There is no need to remove the pin portion 9 as well as the cable portion 8a when adjusting the threaded coupling 2 (i.e. the minimum retraction distance does not need to be a wide as the pin portion 9 to enable adjustment). The cable portion 8a may be moved from one gap 19 to another while the pin portion 9 stays inside the rim 5.

The threaded coupling 2 described herein also provides for secondary locking, such that the lock nut 10 cannot, for example due to vibrations, become, during use, loosened a sufficient distance such that the cable portion 8a becomes disengaged or the pin portion 9 becomes unseated and the threaded coupling 2 becomes unlocked. The provision of secondary locking is of particular use in, for example, the aerospace industry, where vibrations are common and it is vital that components do not become unsecured during use, e.g. during flight.

As shown in more detail in FIGS. 9 and 10, to provide this optional secondary locking, the lock nut 10 comprises at least one through-hole 22. Once the threaded coupling 2 has been assembled, the cable 8 is inserted through one or more of the through-hole(s) 22, pulled taut from the crimp ferrule 11 and secured using an additional crimp ferrule 23. The lock nut 10 is therefore prevented from loosening, as any attempt to unwind the lock nut 10 is resisted by the locking cable 8.

FIG. 10 provides an internal view of the flexible cable portion 8a extending in a generally radial direction from the pin portion 9 and being held taut by the crimp ferrule 11, then extending through two through-holes 22 in the lock nut 10. After threading the cable 8 through the through-holes 22 and pulling the cable 8 taut, the crimp ferrule 23 is applied. It will be appreciated that the cable 8 may continue on to be passed through any number of components, with additional ferrules added along the length of the cable 8 as desired.

In the example of FIG. 1, the threaded coupling 2 is connected to a fibre reinforced polymer (FRP) rod 28, via the end fitting 4. An internally threaded connection portion (not shown) at the opposite end of the end fitting 4 to the annular rim 5 provides connection means to connect the end fitting 4 to the FRP rod 28. During assembly, the end fitting 4 is driven onto the FRP rod 28 by applying a torque to the end fitting 4. Before the threaded coupling 2 is assembled, the projections 18 provide a torque application point with which any suitable torque application tool, e.g. a C spanner (not shown), may be used to drive the end fitting 4 onto the FRP rod 28. The threaded coupling 2 therefore provides coupling with adjustable length and timing between the rod end 6 and the FRP rod 28.

Figure 4:
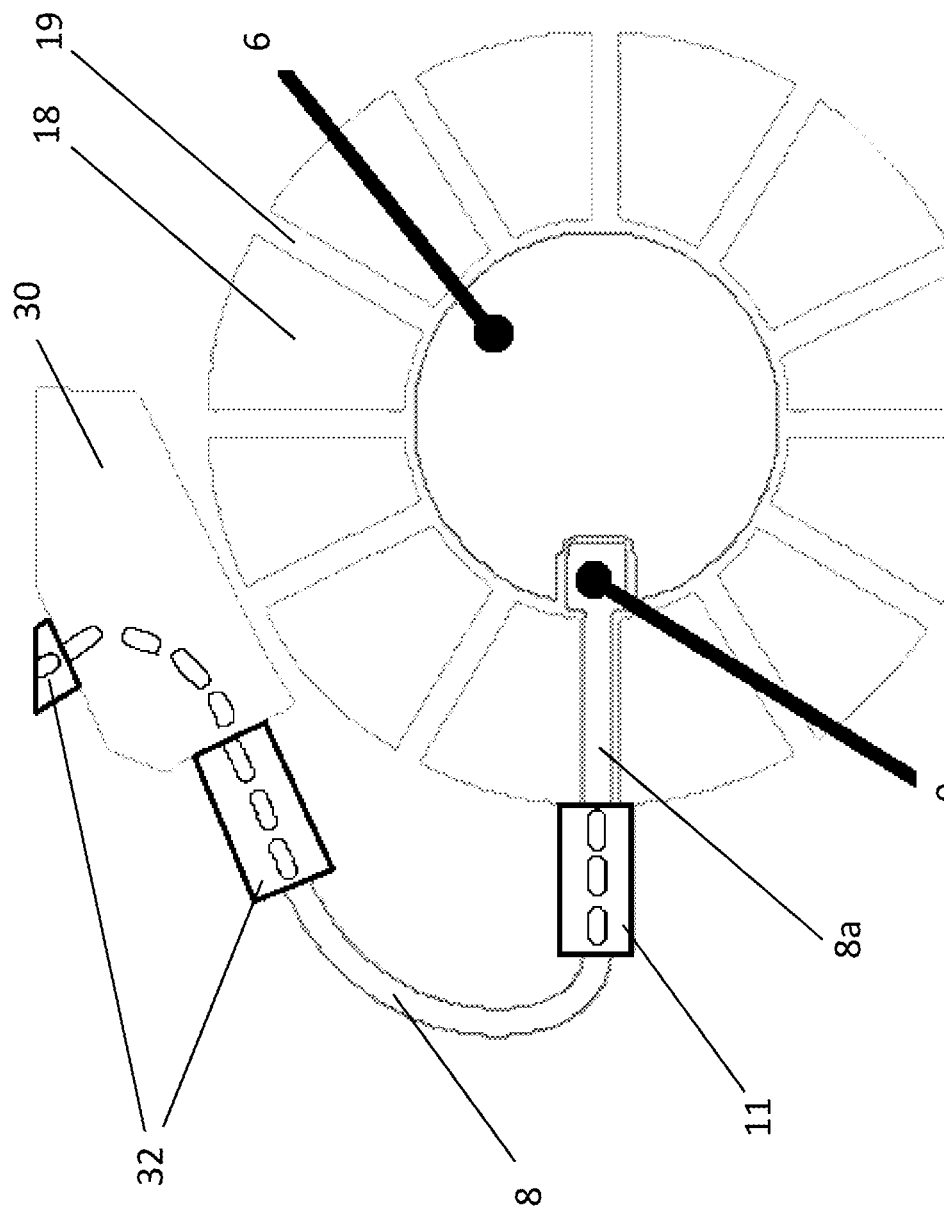
FIGS. 4-8 are cross sectional views of threaded couplings according to various examples of the present disclosure.

FIGS. 2 and 4 are cross sectional views in a plane perpendicular to the axis of rotational symmetry of the cylindrical internally threaded portion 16, cutting through the rim 5, pin portion 9 and locking cable 8. FIG. 3 is a cross sectional view in a plane parallel to the axis A of rotational symmetry of the cylindrical externally threaded portion 12, cutting through the centre of the pin portion 9.

As shown in FIGS. 2, 3 and 4, the end ferrule 9 is seated in the keyway 14 of the rod end 6 and the cable portion 8a extends across the rim 5 in the gap 19 between two projections 18. The crimp ferrule 11 is crimped onto the locking cable 8 as it extends away from the rim 5 such that the cable portion 8a that passes across the rim 5 in the gap 19 is in tension.

The lock nut 10 is tightened against the rim 5 and/or the pin portion 9 to prevent axial movement of the pin portion 9. The pin portion 9 extends up to the entire depth of the keyway 14, such that inward radial movement is prevented. Effective locking may be achieved even when the pin portion 9 is radially smaller than the keyway 14, as it is still confined. Ideally, however, the pin portion 9 radially fills the keyway 14 such that it cannot move radially at all.

In FIG. 4, the locking cable 8 extends to and through a further component 30 (e.g. a cylinder body, a lock washer, a locking tab or a piston rod), where it is again secured with additional crimp ferrules 32.

Figure 5:
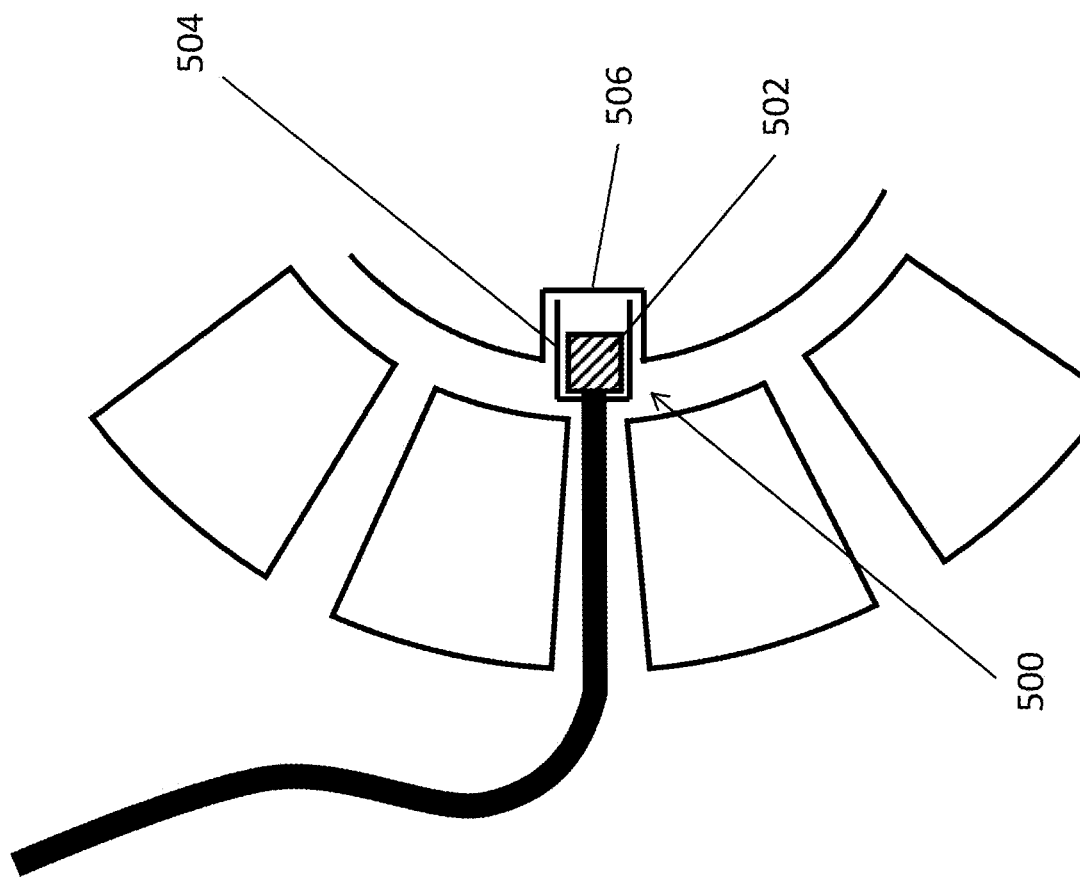

FIG. 5 shows an alternative locking member 500 comprising a pin portion in the form of an end ferrule 502 onto which a cup washer 504 has been slid. The cup washer 504 increases the effective size of the end ferrule 502, enabling the end ferrule 502 to be used effectively in a threaded coupling with a larger keyway 506. A cup washer more generally be used to enable one particular type or size of end ferrule to be used in many different threaded couplings, such that only different cup washers need to be produced for different key cavities, rather than new entire locking assemblies.

Figure 6:
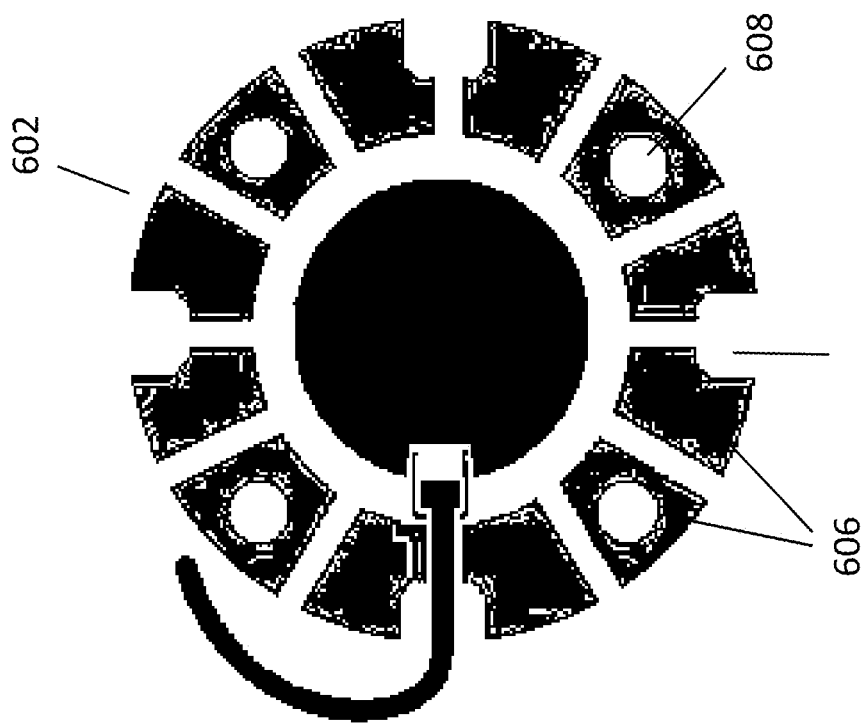

FIG. 6 shows a rim 602 of a first coupling member which features a plurality of projections 606. Four holes 608 have been formed in the rim 602, reducing the weight of the first coupling member. In addition, four notches 610 have been cut into the rim 602. These not only further reduce the weight of the first coupling member but also facilitate the application of torque by an appropriate torque application tool (i.e. for driving the first coupling member onto a further component).

Figure 7:
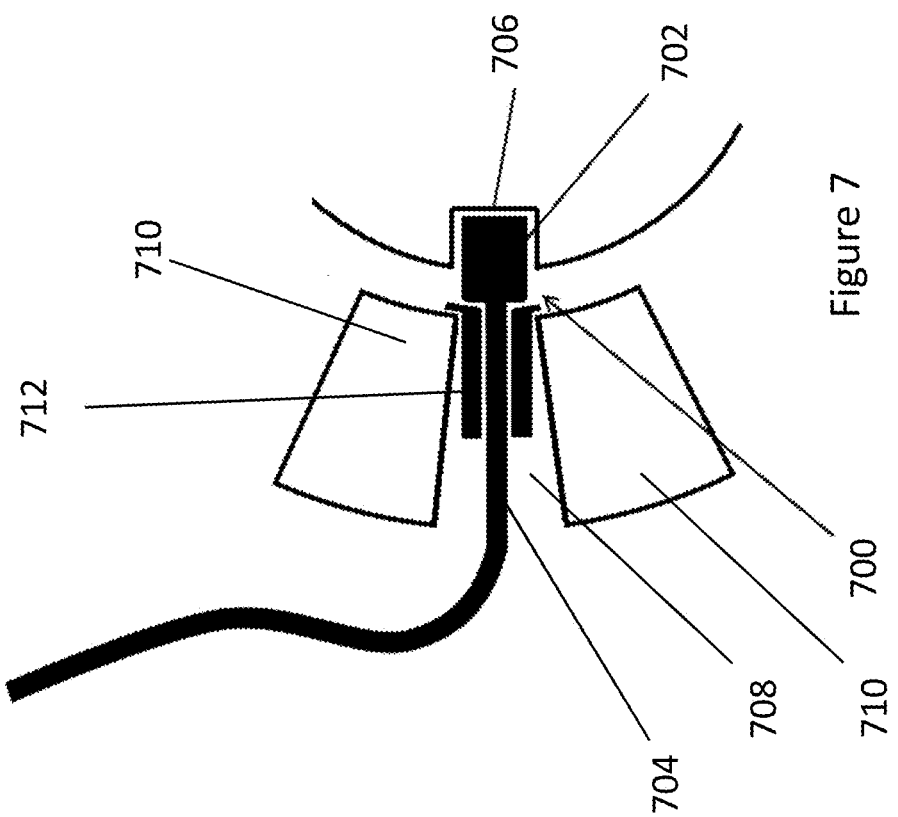

FIG. 7 shows another example of a locking member 700 comprising a pin portion 702 and flexible cable portion 704. The pin portion 702 is seated in a keyway 706 and the flexible cable portion 704 extends from the pin portion 702 through a gap 708 between two projections 710. However, the gap 708 is wider than the flexible cable portion 704 such that a small amount of relative movement between the flexible cable portion 704 and the projections 710 is possible. To prevent this movement, the locking member 700 further comprises a cable sleeve 712 which is placed over the flexible cable portion 704 to increase the effective width of the flexible cable portion 704 to more closely match that of the gap 708. The flexible cable portion 704 is thus held more securely in place and circumferential movement is restricted.

Figure 8:
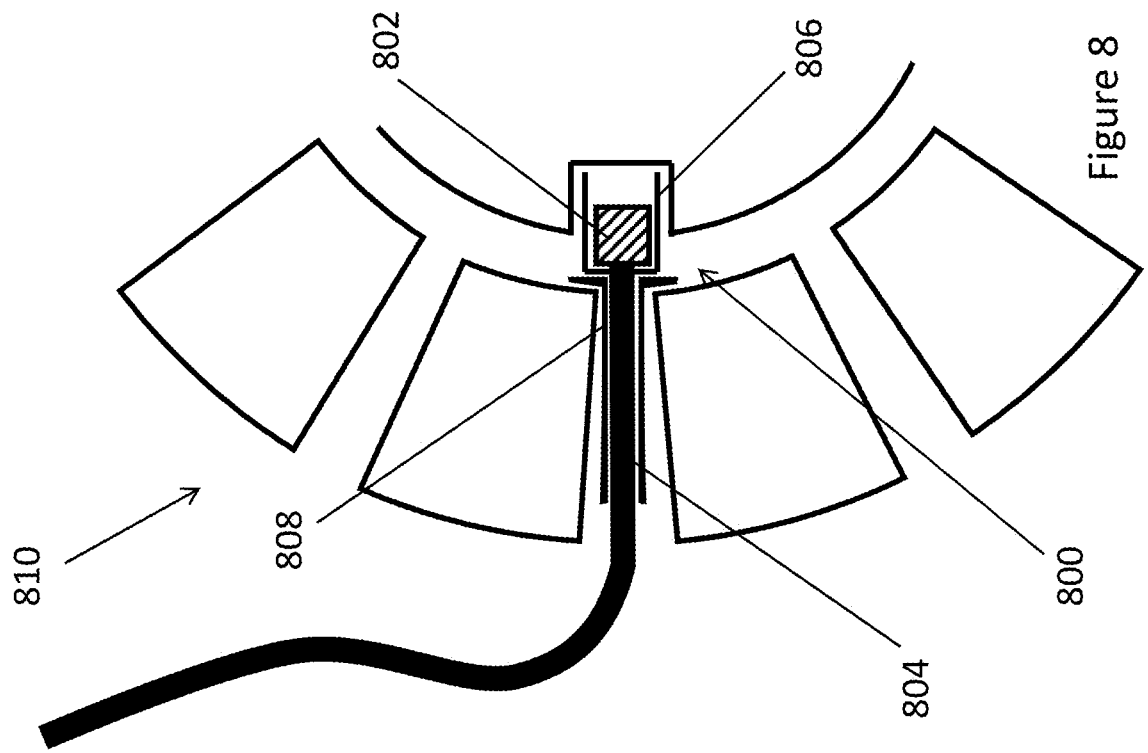

As shown in FIG. 8, a locking member 800 may utilise a cup washer 806 and a cable sleeve 808 to enable an otherwise undersized pin portion 802 and flexible cable portion 804 to be used to lock and time a threaded coupling 810.

FIG. 11 shows a threaded coupling 102 comprising a first coupling member in the form of an end fitting 104, a second coupling member in the form of a rod end 106 and a locking assembly 120 (only shown partially) comprising a locking member and a lock nut 110. The locking member includes a flexible cable portion 108 fixed to a pin portion (not shown) and a ferrule 111. The rod end 106 comprises a cylindrical externally threaded portion and a key cavity in the form of a keyway 114, which comprises a groove cut along the externally threaded portion. The end fitting 104 comprises a cylindrical internally threaded portion (not shown) that is threadedly engaged with the externally threaded portion to couple the end fitting 104 to the rod end 106.

The end fitting 104 further comprises an annular rim 105 that defines a circular opening through which the externally threaded portion may be inserted to engage with the internally threaded portion. The rim 105 comprises a plurality of timing through-holes 107, through one of which the flexible cable portion 108 extends from the pin portion.

Although not shown in FIG. 11, the pin portion is seated in the keyway 114 and positioned inside the rim 105, such that the cable portion 108 extends from the pin portion in a generally radial direction through one of the timing through-holes 107. This prevents the pin portion (which is fixed to the cable portion 108) from moving circumferentially relative to the end fitting 104. The locking assembly further comprises a securing member, shown here as a crimp ferrule 111, which is crimped onto the cable portion 108 as it exits the timing through-hole 107 such that the section of the cable portion 108 that passes through the timing through-hole 107 is put in tension (i.e. it is taut). The locking assembly prevents the first and second coupling members 104, 106 from moving relative to each other, and the threaded coupling 102 is thus locked in position.

The threaded coupling 102 shown in FIG. 11 further comprises a lock nut 110, although this is not essential. The lock nut 110 is tightened against the annular rim 105, which secures the first and second coupling members 104, 106 relative to each other. The lock nut 110 comprises a through-hole 122, through which the flexible cable portion 108 extends after it has emerged from the timing through-hole 107 in the annular rim 105. The flexible cable portion 108 is pulled taut and secured using an additional crimp ferrule 123. Secondary locking is thus provided to the threaded coupling—the lock nut 110 is prevented from loosening because any attempt to unwind the lock nut 110 is resisted by the locking cable portion 108.

The invention claimed is:

1. A threaded coupling comprising:
   a first coupling member, comprising a cylindrical portion which is internally threaded around an axis of rotational symmetry of the cylindrical portion and comprises an open end that defines an opening with an annular rim, the annular rim comprising at least one projection that projects in a generally axial direction parallel to the axis of rotational symmetry of the cylindrical portion and that comprises a side surface that at least partially defines a gap in the annular rim;
   a second coupling member comprising an externally threaded portion and at least one key cavity; and
   a locking assembly comprising:
      a locking member comprising a pin portion fixed to a flexible cable portion; and
      a lock nut;
      wherein the externally threaded portion is arranged to be received through the opening to be threadedly engaged with the internally threaded cylindrical portion, to couple the first coupling member to the second coupling member; and
      wherein, when the first coupling member is coupled to the second coupling member:
      the pin portion is arranged to be seated in the at least one key cavity and be confined by an inner surface of the annular rim so as to restrict radial movement of the pin portion;
      the flexible cable portion is arranged to extend from the pin portion through the gap in the annular rim in a generally radial direction adjacent to the side surface of the at least one projection so as to restrict circumferential movement of the flexible cable portion; and
      wherein the lock nut is arranged, when the first coupling member is coupled to the second coupling member, to be threaded onto the second coupling member and positioned so as to restrict axial movement of the pin portion.

2. The threaded coupling as claimed in claim 1, wherein the locking member further comprises a securing member which is secured to the flexible cable portion and abuts a radially exterior surface of the rim so as to hold taut the flexible cable portion between the pin portion and the securing member.

3. The threaded coupling as claimed in claim 1, wherein the lock nut comprises at least one through-hole through which the flexible cable portion extends and is secured thereat.

4. The threaded coupling as claimed in claim 1, wherein the pin portion has an angular extent relative to the cylindrical portion of less than 180°.

5. The threaded coupling as claimed in claim 1, wherein the at least one projection projects a projection distance in the axial direction and the flexible cable portion has a width that is less than or equal to the projection distance.

6. The threaded coupling as claimed in claim 1, wherein the lock nut is arranged, when the first coupling member is coupled to the second coupling member, to be positioned such that it abuts the pin portion and/or the annular rim.

7. The threaded coupling as claimed in claim 1, wherein the first coupling member comprises a plurality of projections positioned around the annular rim such that one or more gaps are defined therebetween by side surfaces of the projections, and the flexible cable portion is arranged to extend from the pin portion through at least one of the one or more gaps.

8. The threaded coupling as claimed in claim 1, wherein the locking assembly comprises an adapter member arranged to modify the shape of the pin portion and/or a cable sleeve arranged to adapt the shape of the flexible cable portion.

9. The threaded coupling as claimed in claim 1, wherein the at least one projection is arranged to be a torque application point for driving the first coupling member onto a further component.

10. The threaded coupling as claimed in claim 9, wherein the annular rim comprises one or more additional features to facilitate the application of torque.

11. The threaded coupling as claimed in claim 1, wherein the second coupling member comprises a rod end, a clevis, a blade end, a bush housing or any other suitable component that may require precise timing.

12. A method of assembling a threaded coupling, the threaded coupling comprising:
a first coupling member, comprising a cylindrical portion which is internally threaded around an axis of rotational symmetry of the cylindrical portion and comprises an open end that defines an opening with an annular rim, the annular rim comprising at least one projection that projects in a generally axial direction parallel to the axis of rotational symmetry of the cylindrical portion and that comprises a side surface that at least partially defines a gap in the annular rim;
a second coupling member comprising an externally threaded portion and at least one key cavity; and
a locking assembly comprising:
a locking member comprising a pin portion fixed to a flexible cable portion; and
a lock nut;
wherein the method comprises:
threading the lock nut onto the second coupling member;
threadedly engaging the first coupling member onto the second coupling member to couple the first coupling member to the second coupling member;
positioning the locking member such that the pin portion is seated in the at least one key cavity and confined by an inner surface of the annular rim and the flexible cable portion extends from the pin portion through the gap in the annular rim in a generally radial direction adjacent to the side surface of the at least one projection; and
positioning the lock nut so as to restrict axial movement of the pin portion.

13. The method as claimed in claim 12, further comprising putting in tension the flexible cable portion extending adjacent to the surface of the at least one projection.

14. The method as claimed in claim 12, wherein the lock nut comprises at least one through-hole and the method comprises extending the flexible cable portion through the at least one through-hole and securing the flexible cable portion thereat.

15. A threaded coupling comprising:
a first coupling member, comprising a cylindrical portion which is internally threaded around an axis of rotational symmetry of the cylindrical portion and comprises an open end that defines an opening with an annular rim, the annular rim comprising at least one timing through-hole that extends through the rim in a generally radial direction perpendicular to the axis of rotational symmetry of the cylindrical portion;
a second coupling member comprising an externally threaded portion and at least one key cavity; and
a locking assembly comprising:
a locking member comprising a pin portion fixed to a flexible cable portion;
wherein the externally threaded portion is arranged to be received through the opening to be threadedly engaged with the internally threaded cylindrical portion, to couple the first coupling member to the second coupling member; and
wherein, when the first coupling member is coupled to the second coupling member:
the pin portion is arranged to be seated in the at least one key cavity and be confined by an inner surface of the annular rim so as to restrict radial movement of the pin portion;
the flexible cable portion is arranged to extend from the pin portion in a generally radial direction through the at least one timing through-hole so as to restrict circumferential and axial movement of the flexible cable portion.

* * * * *